United States Patent
Sladden

(10) Patent No.: US 7,369,996 B2
(45) Date of Patent: May 6, 2008

(54) SYSTEM AND METHOD FOR VOICE BASED NETWORK MANAGEMENT

(75) Inventor: Darryl Sladden, Sunnyvale, CA (US)

(73) Assignee: Cisco Technology Inc., San Jose, CA (US)

( * ) Notice: Subject to any disclaimer, the term of this patent is extended or adjusted under 35 U.S.C. 154(b) by 840 days.

(21) Appl. No.: 10/642,039

(22) Filed: Aug. 15, 2003

(65) Prior Publication Data

US 2005/0038658 A1    Feb. 17, 2005

(51) Int. Cl.
   - G10L 13/06 (2006.01)
   - G10L 21/00 (2006.01)
   - G10L 11/00 (2006.01)
   - G06F 15/173 (2006.01)

(52) U.S. Cl. ............... 704/270.1; 704/275; 709/223; 709/224

(58) Field of Classification Search ............... 704/275, 704/270.1; 709/224
See application file for complete search history.

(56) References Cited

U.S. PATENT DOCUMENTS

| | | | |
|---|---|---|---|
| 5,426,421 A | | 6/1995 | Gray |
| 5,819,177 A | * | 10/1998 | Vucetic et al. ............ 455/425 |
| 6,154,526 A | * | 11/2000 | Dahlke et al. ............ 379/88.03 |
| 6,272,522 B1 | * | 8/2001 | Lin et al. ............ 709/200 |
| 6,510,417 B1 | * | 1/2003 | Woods et al. ............ 704/275 |
| 6,662,163 B1 | * | 12/2003 | Albayrak et al. ............ 704/275 |
| 2003/0131113 A1 | | 7/2003 | Reeves et al. |
| 2004/0128139 A1 | * | 7/2004 | Ilan et al. ............ 704/275 |

FOREIGN PATENT DOCUMENTS

| | | |
|---|---|---|
| GB | 2 365 145 | 2/2002 |
| WO | WO 02/073445 | 9/2002 |

OTHER PUBLICATIONS

Remington, R. "Spoken language interface for a network management system," *Proceedings of the SPIE—The International Society for Optical Engineering*, Sep. 1999, pp. 134-142.

* cited by examiner

*Primary Examiner*—David Hudspeth
*Assistant Examiner*—Justin W. Rider
(74) *Attorney, Agent, or Firm*—Stolowitz Ford Cowger LLP

(57) ABSTRACT

The present invention provides a system and method for voice based network management. A network management system uses voice based scripts that allow network management operations to be performed over a phone. In one embodiment, the voice based scripts use a Voice Extensible Markup Language (VXML). However, the voice based script can be any form of communication that allows a user to conduct network management operations using Dual Tone Multi-Frequency (DTMF) signaling or speech commands.

43 Claims, 6 Drawing Sheets

SYSTEM AND METHOD FOR VOICE BASED NETWORK MANAGEMENT

BACKGROUND

1. Field of the Invention

The present invention pertains to the field of network management.

2. Background of the Invention

A computer network generally includes a number of network devices or components, such as routers, switches, gateways, etc. Generally, each network device has status conditions that may continuously change during operation. For example, a network router may have a variable number of network connections open at any one time.

Network management pertains to issuing commands and gathering information from these network devices. For example, a network administrator may want to monitor or manage the number or type of network connections for the router or simply verify the router is up and running. Different network protocols such as SNMP (Simple Network Management Protocol), Telnet, or HTTP (Hypertext Transfer Protocol) are used for conducting these network management operations.

The problem with current network management systems is that they require a computer terminal for accessing the network device and retrieving the network management data.

SUMMARY OF THE INVENTION

The present invention provides a system and method for voice based network management. A network management system uses voice enabled scripts that allow network management operations to be performed over any generic POTS phone. In one embodiment, the voice based scripts use a Voice Extensible Markup Language (VXML). However, the voice enabled script can be any form of communication that allows a user to conduct network management operations using Dual Tone Multi-Frequency (DTMF) signaling or speech commands.

Other features and embodiments of the present invention will be apparent from the accompanying figures and from the detailed description, which follows.

BRIEF DESCRIPTIONS OF THE DRAWINGS

The invention may best be understood by reading the disclosure with reference to the drawings, wherein.

DETAILED DESCRIPTION OF EMBODIMENTS

Several embodiments of the present invention are described below. Although the specification may refer to "an", "one", "the", "some," "alternative," or "exemplary" embodiment(s) in several locations, this does not necessarily mean that each such reference is to the same embodiment(s), or that the feature only applies to a single embodiment. Additionally, it will be evident to one skilled in the art that the present invention is not limited by the described embodiments.

Figure 1:
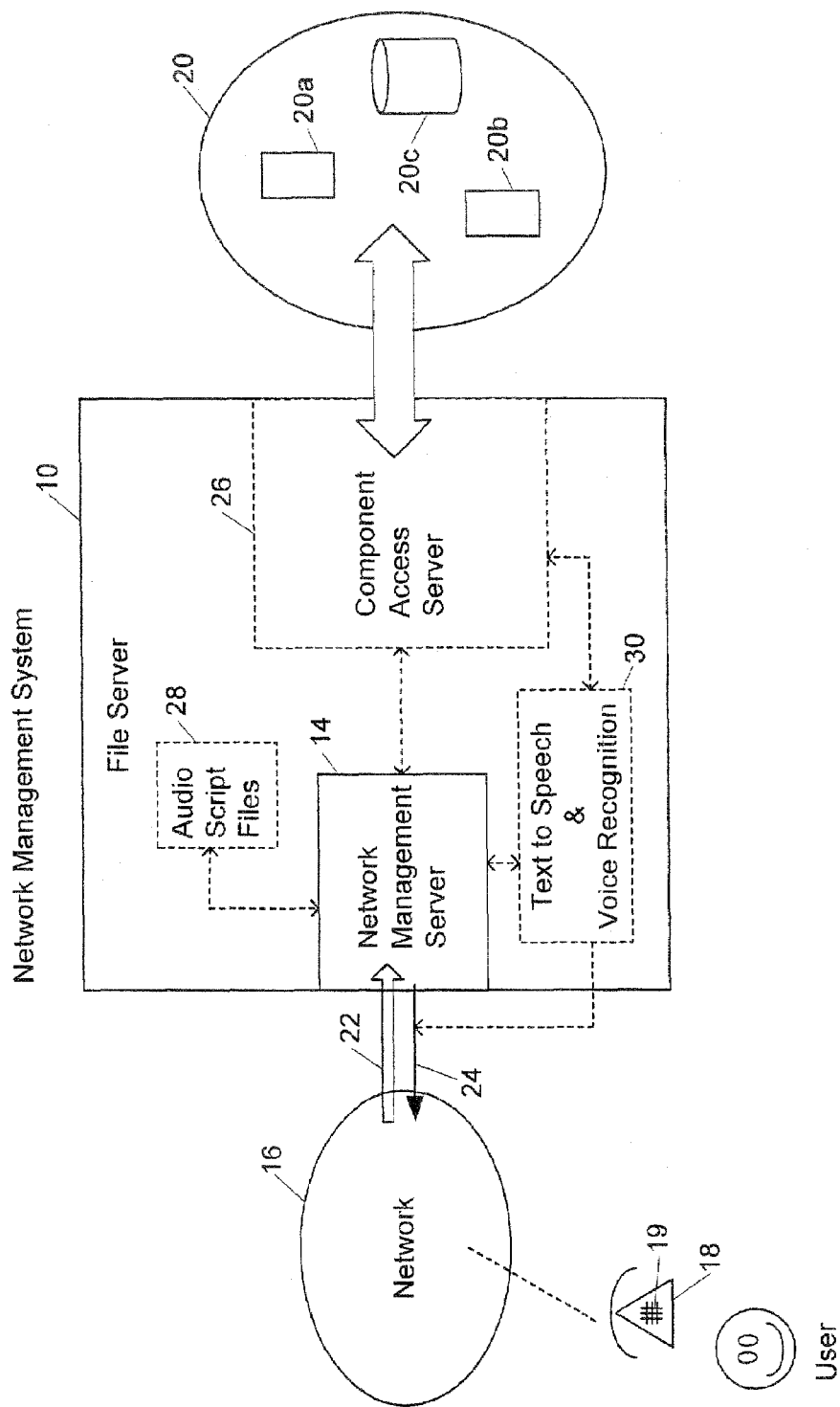
FIG. 1 is a general schematic representation of a network management system according to the present invention.

FIG. 1 shows a network management system 10 according to the present invention. System 10 includes a network management server 14 that can be any type of network processing device such as a server, gateway, router, switch, etc. A network 16 communicatively couples server 14 to a phone 18. In one example, network 16 is a PSTN (Public Switched Telephone Network). However, network 16 can be any network that connects phone 18 to server 14. Phone 18 may be a conventional wired telephone; a wireless telephone, such as a cellular telephone; a VoIP (Voice Over Internet Protocol) phone; or any other type of device used for sending and receiving audio and DTMF signals. In the case of the VoIP phone, part of network 16 may be an IP (Internet Protocol) network.

In some embodiments, the network management server 14 may implement security measures to ensure that a user is authorized to perform network management operations. For example, server 14 may use ANI (Automatic Number Identification) to identify the number of the caller and use DNIS (Dialed Number Identification Service) to identify the number dialed by the user. Server 14 then matches the ANI and DNIS numbers with stored authorized phone numbers. In other embodiments, server 14 may use a PIN (Personal Identification Number) and/or other security measure(s) to authenticate the user.

The network management server 14 generates one or more voice enabled scripts after the user is authenticated. The voice enabled scripts are alternatively referred to as voice based scripts or voice scripts. In one example, the server 14 supports voice based scripts generated using VxML (Voice Extensible Markup Language). VxML is known in the art and therefore is not described in further detail. Alternatively, server 14 may generate voice enabled scripts using a TCL (Tool Command Language) and will also use audio files for user interaction. The user on phone 18 responds to the voice script with a network management request 22. The request 22 is either a verbal request spoken by the user or DTMF (Dual-Tone Multi-Frequency) signals generated when the user presses keys 19 on a keypad on phone 18.

Network management server 14 communicates the request 22 to the network management system 10. The network management system 10 processes the request 22 by accessing and querying network components 20. The particular network component 20 accessed may be identified in the request 22. For example, the user may identify a router IP address by generating DTMF signals or by speaking the router address into phone 18.

Network components 20 may include, for example, a router 20a, IP phone manager 20b, and customer data sources 20c. Customer data sources 20c may include traditional network management data, located, for example, at a certain URL (Uniform Resource Locator). Network components 20 are not limited by the above examples, and may include any type of network device that needs to be queried for network management data. Methods of accessing and obtaining management information from network components 20 are known in the art and include SNMP (Simple Network Management Protocol), Telnet, and HTTP (Hypertext Transport Protocol).

Network management system 10 retrieves network device information from one or more of the components 20 and returns it to the user via the network management server 14. The management information retrieved from components 20 is converted into voice based scripts, for example, using a VxML page. The VxML page is then audibly rendered by server 14 to the phone 18 as an audio stream 24. If applicable, the user at phone 18 may then make further network management requests, or simply hang up. For example, the voice script may list multiple interfaces on one of the network components 20 and query the user to select one of the verbally identified interfaces. The user would then select one of the verbally identified interfaces either by verbally speaking the interface name or pressing keys on phone 18.

Some embodiments of network management system 10 include a component access server 26. In one embodiment, the component access server 26 receives a request from the network management server 14 for management information. Server 26 determines how to access a particular network component 20, and then queries the network component 20 and retrieves the management information requested by server 14. In other embodiments, the functions performed by component access server 26 are performed by server 14.

Other embodiments of network management system 10 include a file server 28 that may be a separate device or part of network management server 14. File server 28 stores and provides voice based scripts to server 14. In another embodiment, the file server 28 stores and provides pre-recorded audio files that are played out by network management server 14.

Other embodiments of network management system 10 include an audio conversion component 30. The audio conversion component 30 may be a separate device or program that translates between an audio stream and computer readable text. For example, the audio conversion component 30 may include a TTS (Text-To-Speech) system that converts the voice based scripts from server 28 to audio streams for outputting to phone 18. The audio conversion component 30 may also include an ASR (Automatic Speech Recognition) system for converting audio streams from phone 18 into computer readable text.

Figure 2:
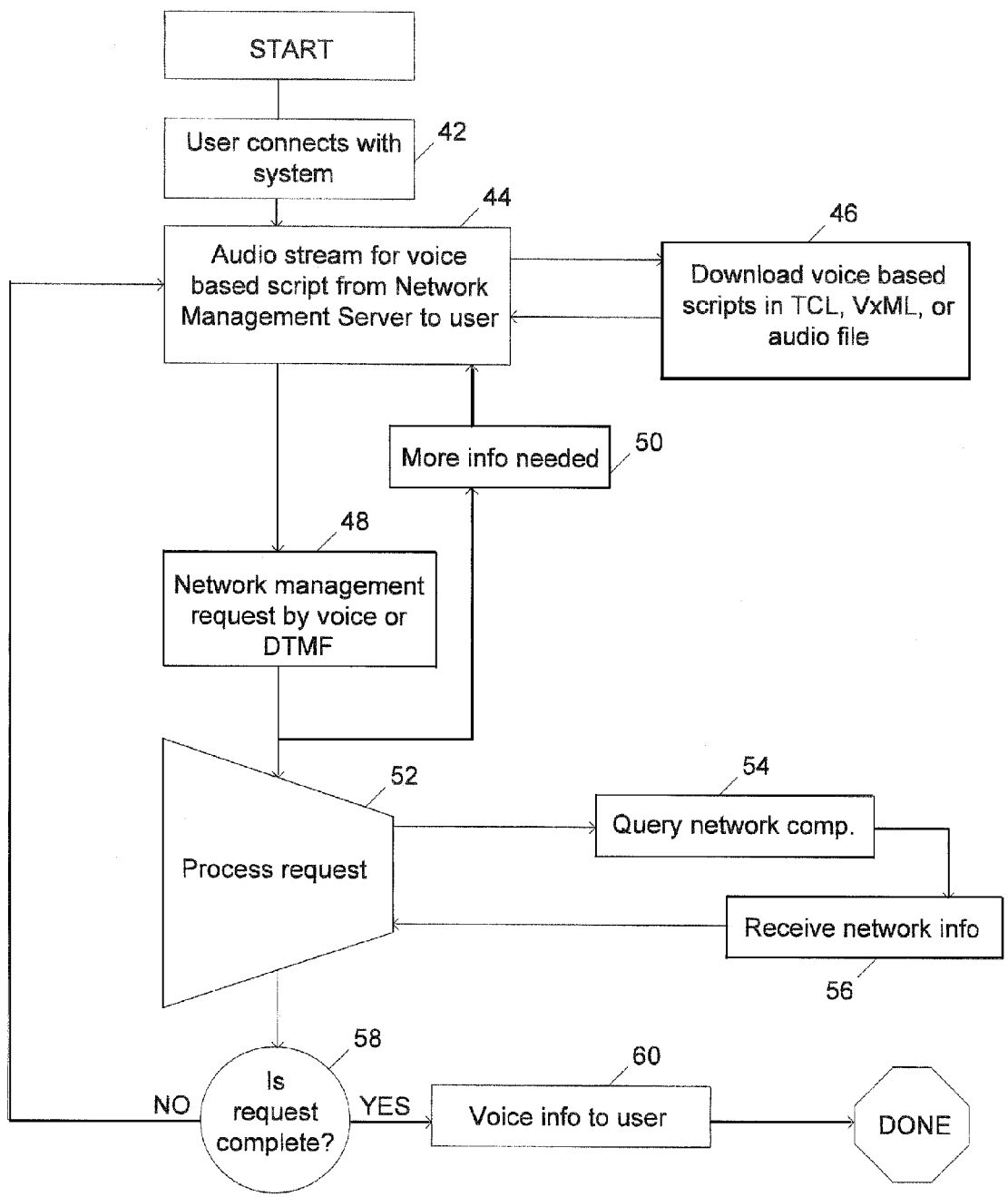
FIG. 2 is a flow chart showing how a network management operation is performed using the network management system.

FIG. 2 is a flow chart showing how a network management operation is performed by the network management system 10 shown in FIG. 1. In box 42, a caller connects with the network management system by calling into the network management server 14 via phone 18. As described above, security measures may be implemented to ensure that the caller is authorized. In box 44, the network management server 14 reads out a voice based script to the user, for example, as an audio stream. In one embodiment, as shown by box 46, the script may be downloaded as a VxML page from the file server 28. In other embodiments, the script may be a TCL (Tool Command Language).

In box 48, the user responds to the script either by speaking a network management request or by generating DTMF signals via keys on the phone keypad. If more information is needed from the user prior to processing the request, additional audio scripts are provided to the user in box 50. In this case, additional audio scripts may be downloaded from the file server 28. Once enough information has been received from the user, the network management server 14 processes the request in box 52. Box 54 illustrates one embodiment where the request is processed by querying a network component using a standard access method, such as SNMP, Telnet, or HTTP. The management information from the network component is retrieved in box 56.

In box 58, the network management server 14 determines if the request has been completely processed or if more information is needed. If the request is not complete, another voice based script is spoken to the user in box 44. The next voice script may also contain some or all of the information obtained from the network component. For example, the voice script may identify each interface for a particular network component. The voice script would then ask the user to select one of the identified interfaces and identify what information should be queried for the selected interface.

If the request is complete, then the information in the voice script is output to the user in audio form in box 60. For example, a VxML page is translated to audio and sent to the user phone. If the user is satisfied, the process is complete and the user may hang up. Alternatively, the network management server 14 may provide the user with the option to make another request or to modify or correct the previous request, in which case, the process will loop back to box 44.

Figure 3:
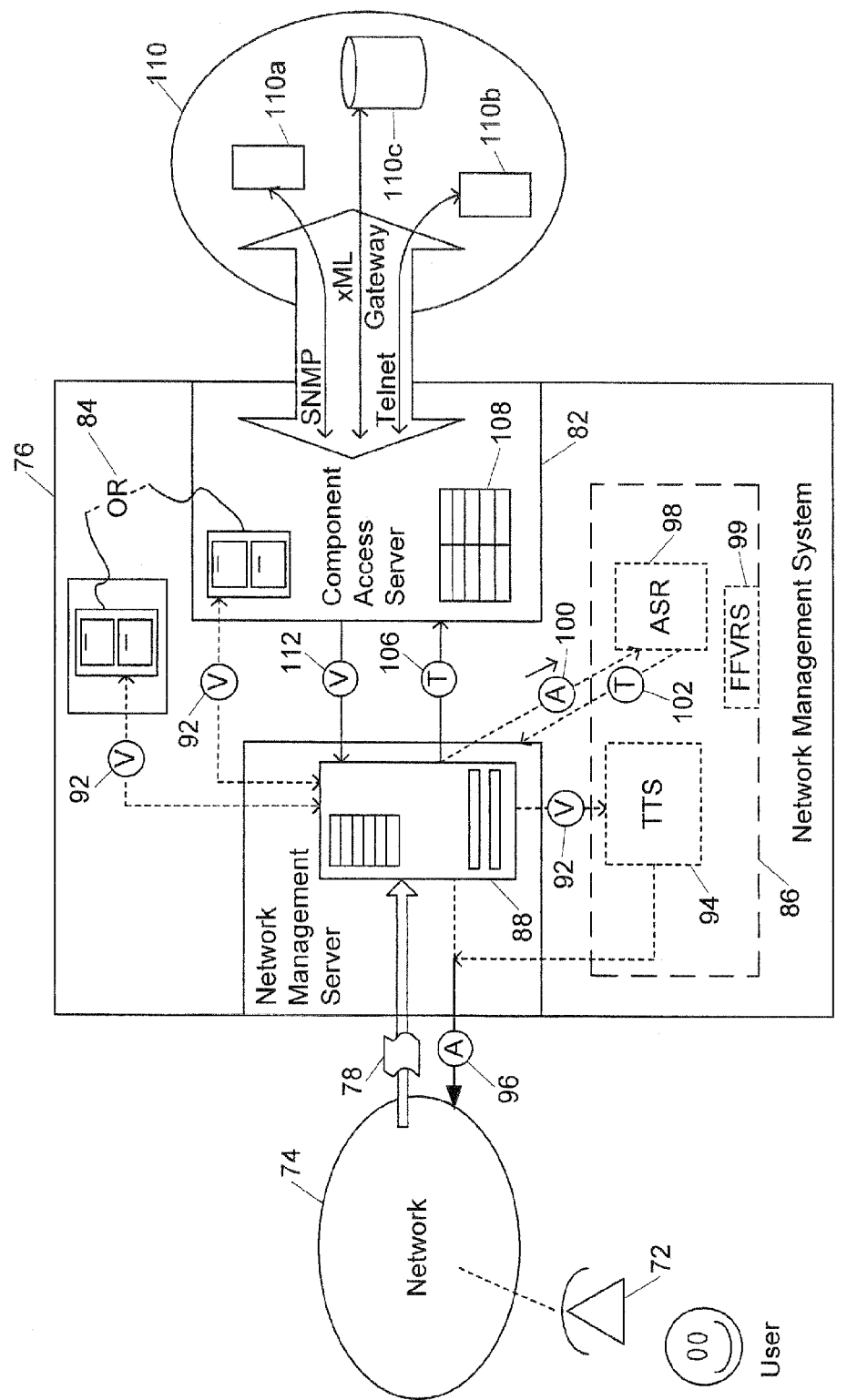
FIG. 3 is a more detailed schematic representation of one embodiment of a network management system.

FIG. 3 is a more detailed schematic representation of a network management system 76 comprising a network management server 88, component access server 82, file server 84 and audio conversion component 86. Network management server 88 may be any router or routing software known in the art that supports a voice based language, such as VxML. For example, network management server 88 may be a VxML enabled IOS (Inter-network Operating System) based gateway. In one embodiment, network management system 76 is a single device that performs all the operations of servers 88, 82, and 84. In another embodiment, file server 84 is implemented in server 88 or server 82. Alternatively, file servers 88, 82, and 84 are separate stand alone devices connected together through an IP and/or circuit switched network.

A user at telephone 72 dials into the network management server 88 via network 74. Server 88 reads out a voice enabled script 92 from server 84, or a manipulation thereof, as an audio stream 96. In one embodiment, server 88 passes the voice based script 92 to a TTS (Text-To-Speech) device 94 that reads out the audio stream 96 to the phone 72. One type of TTS device 94 converts a text string to an audio media stream encoded in G711. Alternatively, the server 88 may have an internal speech generation system.

In response to the audio stream 96, the user at phone 72 makes a network management request 78 either by voice or by DTMF signaling. In one embodiment, network management server 88 uses an ASR (Automatic Speech Recognition) device 98 to translate a spoken response from an audio stream 100 extracted from request 78 into computer readable text 102.

In one embodiment of the present invention, audio conversion component 86 also includes a FFVRS (Free-Form Voice Response System) 99 that translates a free-form voice response received from the phone 72. A free-form voice response may comprise a voice response by the user in descriptive language not recognizable by, for example, a VxML script. Free-form voice response system 99 may comprise a storage device with a stored vocabulary and thesaurus of lexical structure and terms. System 99 may, for example, parse individual words from the voice response into recognizable tokens by interpreting the free-form voice response against the vocabulary in system 99.

In one embodiment, TTS 94, ASR 98, FFVRS 99, and any other audio conversion devices are implemented in software in server 88 or 82. Alternatively, one or more of TTS 94, ASR 98, and FFVRS 99 are stand alone devices or implemented as part of another server, or other network component.

Considering that the user may be using a cellular phone while driving, or be in other noisy or distracting conditions, the audio conversion component 86 may comprise additional technologies to increase audio clarity or reduce noise.

As described above, if the user response to the first voice based script 92 is insufficient to completely process the request 78, additional voice based scripts 92 are downloaded from server 84 to server 88. The interaction with the user of phone 72 continues until the network management server 88 has sufficient information to process the request from the user.

Server 88 routes computer readable text 106 containing the network management request 78 to component access server 82. In one example, the computer readable text 106 contains an IP address provided by the user to identify a network component 110. In this example, server 82 uses the IP address to access a lookup table 108 to determine how to access the identified network component 110. For example, a router 10*a* may be accessed using SNMP, an IP manager 110*b* may be reached using a Telnet connection, and a customer database 110*c* may be reached via an XML gateway.

Network information from the network component 110 is processed by component access server 82 and returned to management server 88 using voice based script 112. Voice based script 112 may provide the user with a complete answer to the request 78 or provide further network management options. Network management server 88, using, for example, TTS 94, generates speech that reads out the voice based script 112 to the phone 72. As described above, this process can repeat until the user audibly hears all the necessary network management information.

Figure 4:
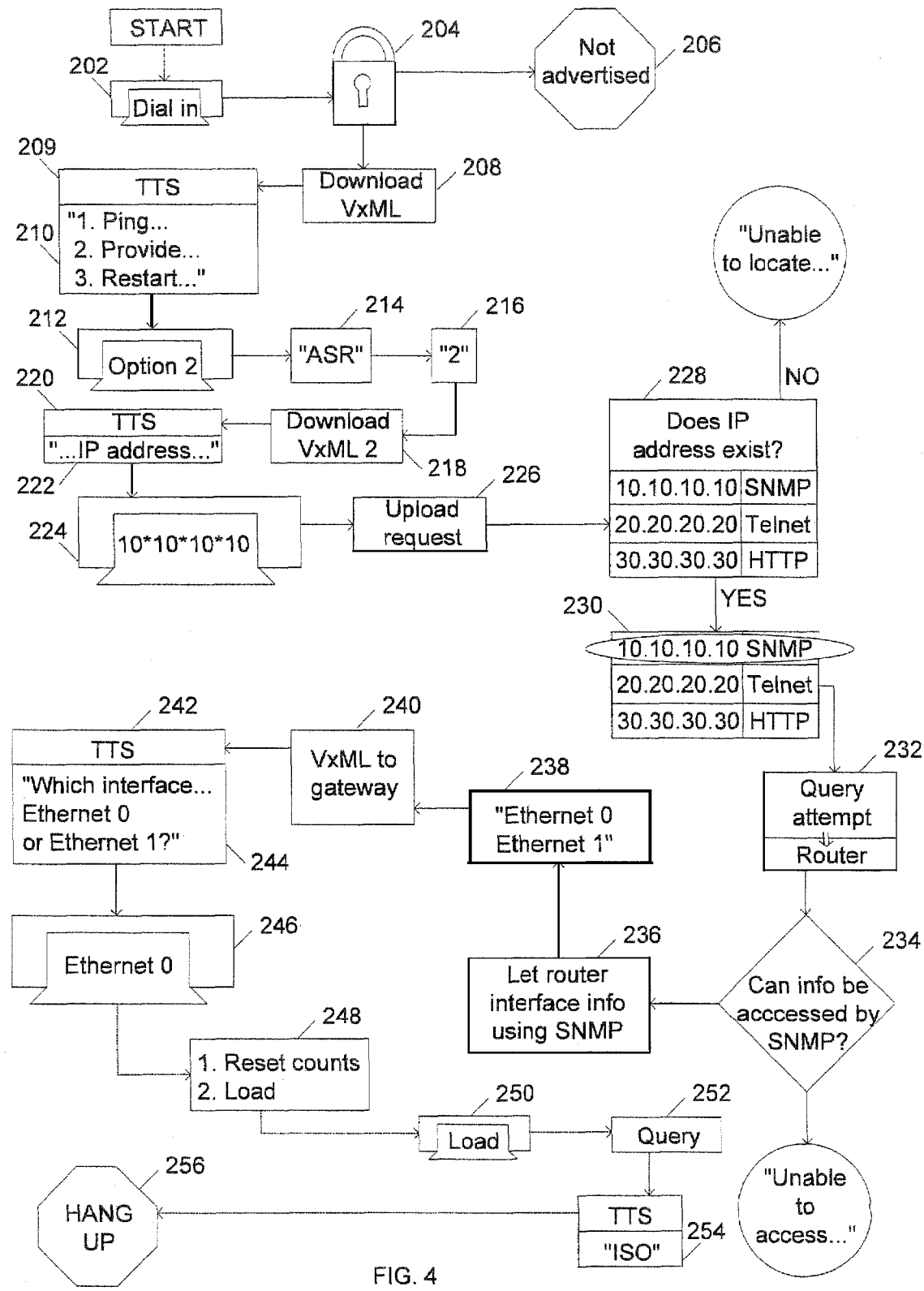
FIG. 4 is a flow chart showing how a network management operation is performed using a phone.

FIG. 4 is a flow chart showing an example of how network management operations are performed using a phone. Referring to FIGS. 3 and 4, at box 202, a user dials into the network management server that supports VxML. At box 204, the server determines if the user is authorized to access network management tasks. As described above, ANI, DNIS, and/or PIN or other security measures may be used for authorization.

If the user is not authorized to access network management tasks, at box 206, a message is voiced to the user that access the network is not authorized. If the user is authorized to access network management tasks at box 208, a VxML script is downloaded to the network management server 88. In the example of box 209, the VxML script is sent to a TTS device. In box 210, the TTS device voices the VxML script to the user phone 72. In this example, the VxML script provides the following network management options to the user:

1. Ping a network component to determine if it is up and available
2. Provide information on the interfaces of a router
3. Restart router The VxML script may be programmed to provide any variety of network management options.

At box 212, using the phone, the user selects option 2, requesting information on a router interface. In one example, the user states, "option 2." Alternatively, as described above, a user may select option 2 by pressing the 2 key on the phone keypad or describe option 2 in free-form language. In box 214, the user's audio stream is routed to the ASR. In box 216, the ASR returns a text value of "2" along with a confidence level. In box 218, a second VxML script is downloaded to the network management server.

In box 220, a second VxML script asks the user to enter an IP address for the desired router. In box 222, the TTS plays the IP address query script as an audio stream to the phone. In box 224, the user enters the IP address either by speaking it or using DTMF signaling. In the example, an IP address of 10.10.10.10 is entered on the phone keypad (DTMF signaling) as 10*10*10*10. In box 226, the user response is uploaded to the component access server 82 (FIG. 3).

In box 228, the component access server looks up the IP address in lookup table 108. The lookup table may be internal to the component access server. Alternatively, the lookup table may be located on a remote server.

If the IP address does not exist in the lookup table, then the network management server 88 may upload a VxML page stating, for example, "unable to locate IP address." In box 230, the IP address is found. The network component server 82 uses the lookup table to determine the access method for accessing the network component 110 associated with the selected IP address. As described above, some access methods may include XML, HTTP, SNMP, or Telnet.

In box 232, the component access server 82 sends a query to the identified network component 110. Here, the network component having IP address 10.10.10.10 is queried. An SNMP query is sent to the specified network component along with the appropriate OID (Object Identifier). Of course, the lookup table is only exemplary, and any access method and IP address combination contemplated by the art can be used. For example, a Telnet or XML query may be accompanied with a user id and password.

In box 234, the network component server determines what needs to be accessed from the component 110 based on the user's request. If the information requested cannot be accessed by the method selected from the lookup table, a VxML page is uploaded to network management server 88 with a message such as "Unable to access information." This may happen, for example, where the user intended to check the load for a router at IP address 10.10.10.10, but accidentally voiced the IP address 20.20.20.20 pointing to a dead link.

In box 236, the component access server 82 queries the network component 110 at IP address 10.10.10.10 for the information requested by the user. For example, in box 238, the SNMP session returns with a value of "Ethernet 0, Ethernet 1." In box 240, the component access server 82 sends this network information in the form of a VxML page to the network management server 88.

Note that, in an alternative embodiment, instead of the component access server 82 sending one or more VxML pages to the management server 88, the component access server 82 may send the VxML page to the TTS device 94 for translation to an audio stream. The TTS device 94 may then send the audio stream directly to the phone 72, or through the server 88 to the phone 72.

In box 242, the network management server 88 sends the VxML page from the component access server 82 to TTS 94 for conversion to an audio stream. In box 244, the audio stream is output to the phone 72. In the example, the TTS 94 may output an audio stream voicing, "Which interface would you like information about: Ethernet 0, Ethernet 1?"

In box 246, the user may respond by DTMF signaling or voice. In the example, the user chooses Ethernet 0. Based on the user's response, further VxML based options may be verbally output to the user. For example, in box 248, a next VxML script verbally provides a query option between "1. Reset Counts" and "2. Load." In box 250, the user selects "Load." In box 252, the network component 110 is queried again by server 82 to determine a load value. The load value is obtained and uploaded to the management server 88 as a VxML page or in some other means that allows audio communication with the phone 72. In box 254 of the example, the management server 88 receives the value of 150 from the component access server 82. A new VxML page is rendered to the phone 72 that voices, "The load on Ethernet 0 is 150." In box 256, if this is all the information that the user needs, the phone call is terminated. Alternatively, if the user makes further requests, the above processes are repeated.

Figure 5:
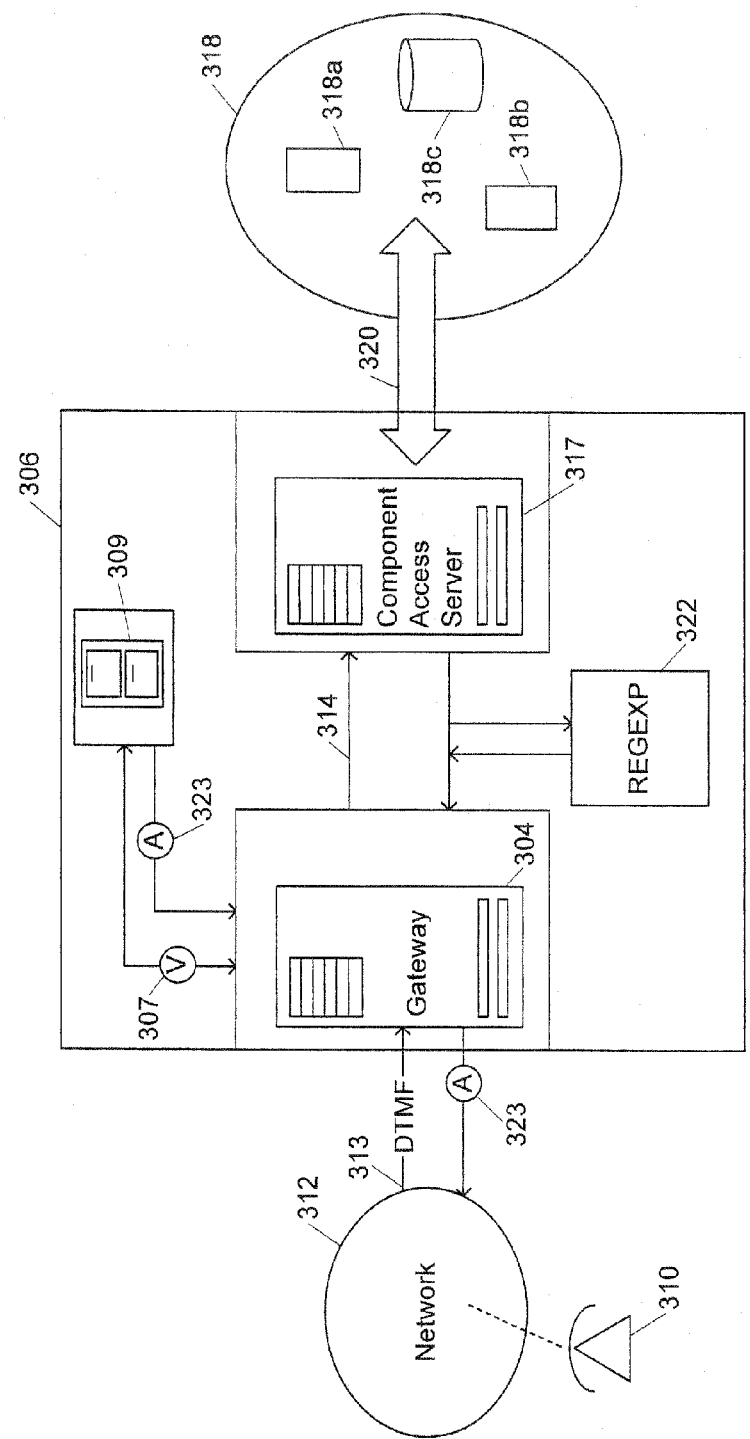
FIG. 5 is a schematic showing an alternative embodiment of the network management system.

FIG. 5 is a schematic representation of a network management system 306 in an alternative embodiment of the present invention. A gateway 304 conducts management operations for network management system 306. If authorized, gateway 304 downloads a voice based script, as one or more TCL (Tool Command Language) pages, from a file server 309. In one example, the TCL page may have predefined actions that it can execute using HTTP GETS. A user at telephone 310 via network 312 interacts with the gateway 304 using DTMF keys on the telephone keypad to communicate a network management request 313.

As described above, the network management request 313 may include more than one transaction with the gateway 304, and may convey an IP address of a desired network component. Gateway 304, upon receiving the DTMF request, may issue an HTTP request 314 to the component access server 317. In the exemplary embodiment, the component access server 317 enables the HTTP interface.

Component access server 317 queries a network component 318 using an HTTP GET data query 320. In one example, a regular expression (REGEXP) device 322 processes network information retrieved from the network components 318. The REGEXP device 322 outputs a file identifier, for example, a single number, to the gateway 304. The file identifier may identify an audio file corresponding to the information received from the network component 318. The gateway 304 downloads the audio file 323 from TFTP (Trivial File Transfer Protocol) server 309 and reads out the audio file 323' to the phone 310. Other embodiments may implement other devices or software as known in the art to translate HTML information into an audio file.

Figure 6:
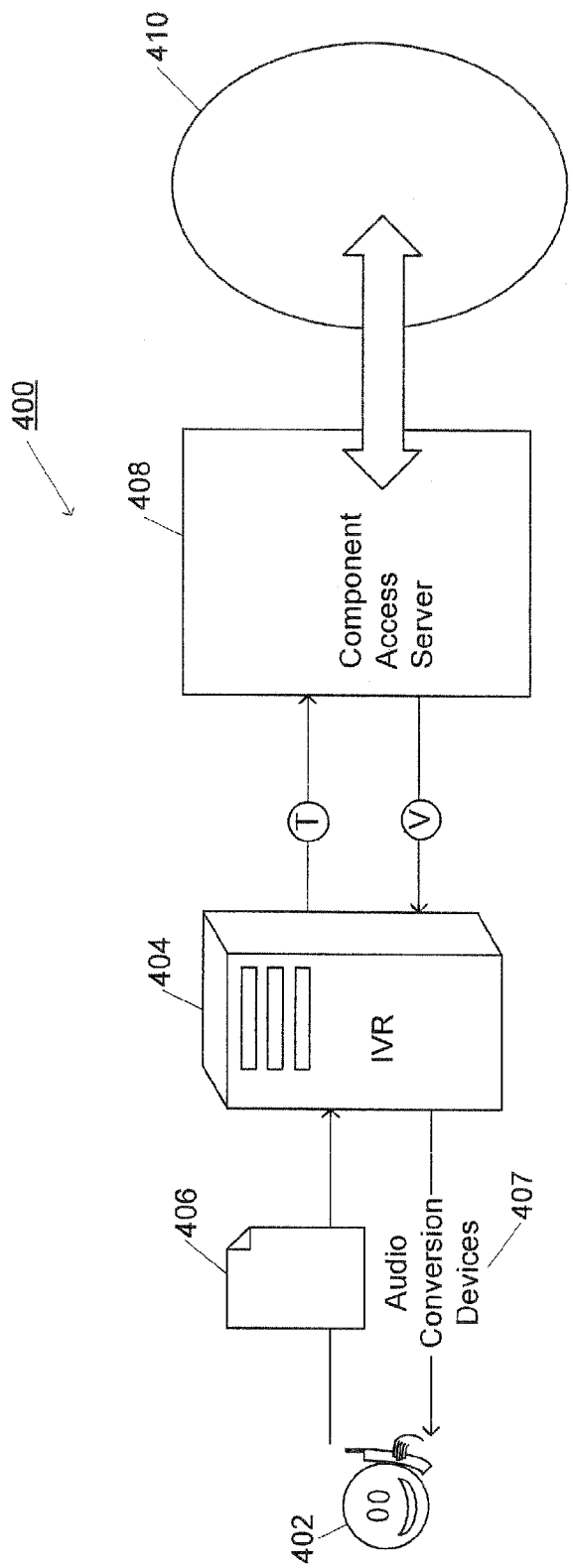
FIG. 6 is a schematic showing another alternative embodiment of the network management system where audio processing is outsourced.

FIG. 6 shows an alternative embodiment of a network management system 400 where the audio conversion devices 407 are outsourced. In the embodiment shown, audio conversion devices such as ASR and TTS are outsourced to an external provider. In the exemplary system, the external provider allows a network administrator 402 to call into its IVR platform 404 and speak or type a query 406 on a standard telephone. The IVR (Interactive Voice Response) platform 404 collects the query information, translates it, and passes it to a component access server 408. Component access server 408 queries network components 410 and retrieves network information using the access methods described above. The server 408 also provides the IVR platform 404 and audio conversion devices 407 with voice based scripts. This allows user queries to be generated using speech or DTMF signals and the voice based scripts to be read out to the operator 402 over a standard telephone.

It may be apparent to one skilled in the art that, alternatively, embodiments could be employed using a VoxML markup language, licensed by Motorola, Inc., Chicago, Ill., and described at http://www.voxml.com, instead of VxML, if router, servers, and other components that support VoxML are accordingly provided.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. All modifications and variations are claimed coming within the spirit and scope of the following claims.

What is claimed is:

1. A system comprising:
a network management device to receive an inbound call remotely initiated by a voice interface device located remotely with respect to the network management device, the inbound call received without prompting by the network management device such that the inbound call is initiated by the voice interface device and not the network management device;
the network management device to use voice scripts to generate speech verbally presenting network management options over the received call;
the network management device to monitor for verbal network management requests received responsive to presenting the verbal network management options; and
the network management device to convert the verbal network management requests received over the inbound call into electronic text and to use the electronic text for conducting network management operations;
wherein the network management device is a computer operable to remotely reconfigure a router, switch, gateway or other network device.

2. A system according to claim 1 further comprising:
the network management device to receive, over the inbound call, an automatic number identification that corresponds to the voice interface device;
the network management device to compare the automatic number identification that indicates a telephone number for the voice interface device to a stored authorization phone number for authorization; and
the network management device to conduct the network management operations when there is authorization based on the comparison.

3. A system according to claim 2 further comprising:
the voice interface device to transfer an inputted personal identification number over the inbound call to the network management device, the inputted personal identification number corresponding to a user of the voice interface device;

the network management device to receive, over the inbound call, the inputted personal identification number that corresponds to the user;

the network management device to determine based on the received personal identification number whether the user of the voice interface device is an authorized user; and the network management device to use the electronic text for conducting network management operations only when there is authorization based on the comparison and when the user of the voice interface device is authorized.

4. A system according to claim 3 wherein the voice interface device is a Voice over Internet Protocol (VoIP) phone.

5. A system according to claim 3 wherein the verbal network management requests comprise speech.

6. A system according to claim 1 wherein the network management device uses the electronic text to generate verbal prompts for initiating the network management operations and to communicate network component configuration information responsive to the network management operations.

7. A system according to claim 1 including a component access device for querying network components for status information.

8. A system according to claim 7 wherein the component access device is part of the network management device or a stand alone server.

9. A system according to claim 7 wherein the component access device includes a lookup table identifying IP addresses for the network components and associated access protocols used for conducting the network management operations.

10. A system as in claim 1 including a file server containing the electronic text for verbally identifying the network management operations and reporting results of the network management operations.

11. A system according to claim 1 wherein the electronic text is in VxML (Voice Extensible Markup Language).

12. The system according to claim 1 wherein the network is the Publicly Switched Telephone Network (PSTN).

13. The system according to claim 1 wherein the automatic number identification is provided by a Dialed Number Identification Service (DNIS).

14. A method of performing a network management operation, comprising:

generating voice scripts using management information received across a network over a remotely initiated connection that is initiated using a phone;

using the voice scripts to identify and initiate network management operations for a network processing device;

conducting network management operations on the network processing device according to phone responses to the voice scripts, the phone responses being received over the remotely initiated connection; and using the voice scripts to report the results of the network management operations back to the phone over the remotely initiated connection.

15. A method according to claim 14 including using the voice scripts to generate speech verbally presenting network management options over the phone, the network management options including pinging a network component to determine if it is up and available, providing information on the interfaces of a router or restarting a router.

16. A method according to claim 15 including using a VxML (Voice Extensible Markup Language) for generating the voice scripts.

17. A method according to claim 14 including receiving speech or DTMF (Dual Tone Multi-Frequency) signals as responses to the voice scripts.

18. A method according to claim 17 including converting the speech or DTMF signals into computer readable text and using the text for conducting the network management operation on the network processing device.

19. A method according to claim 18 including identifying an Internet Protocol (IP) address for the network processing device in the text and using the IP address to identify a network management query protocol supported by the network processing device.

20. A method according to claim 19 including using the query protocol to obtain status information for the network processing device, converting the status information into speech, and sending the speech to the phone.

21. A method according to claim 14 including using the voice based scripts and voice commands from the phone to identify operating status and load conditions for an IP router.

22. The method according to claim 14 wherein the network is the Publicly Switched Telephone Network (PSTN).

23. The method according to claim 14 further comprising generating the voice scripts after verifying that a user of the phone is authorized.

24. The method according to claim 23 further comprising:
identifying a phone number belonging to the phone; and
determining that the remotely initiated connection is authorized when the identified phone number matches a stored authorized phone number.

25. The method according to claim 24 wherein Automatic Number Identification (ANI) or Dialed Number Identification Service (DNIS) is used to identify the phone number.

26. The method according to claim 14 further comprising:
receiving a user identification number over the remotely initiated connection, the user identification number identifying a user of the phone; and
determining that the user is authorized based on the user identification number and when the remotely initiated connection is authorized by verifying a phone number of the phone.

27. A system of performing a network management operation, comprising:
means for generating voice scripts in a first network using management information included in an inbound call that is initiated from a remote second network, the inbound call being unsolicited and initiated from the second network and not the first network;
means for using the voice scripts to identify and initiate network management operations for a network processing device;
means for conducting network management operations on the network processing device according to audible responses to the voice scripts, the audible responses being received over the inbound call; and
means for using the voice scripts to report the results of the network management operations back to the remote second network.

28. A system according to claim 27 including means for using the voice scripts to generate speech verbally presenting the network management options to a remote user that initiated the inbound call.

29. A system according to claim 28 including means for using a VxML (Voice Extensible Markup Language) for generating the voice scripts.

30. A system according to claim 27 wherein the audible responses are speech or DTMF (Dual Tone Multi-Frequency) signals.

31. A system according to claim 30 including means for converting the speech or DTMF signals into computer readable text and using the text for conducting the network management operations on the network processing device.

32. A system according to claim 31 including means for identifying an Internet Protocol (IP) address for the network processing device in the text and using the IP address to identify a network management query protocol supported by the network processing device.

33. A system according to claim 32 including means for using the query protocol to obtain status information for the network processing device, converting the status information into speech, and sending the speech to the remote second network.

34. A system according to claim 27 including means for using the voice based scripts and voice commands received over the inbound call to identify operating status and load conditions for an IP router.

35. The system of claim 27 wherein the first network is a packet switched network and the second network is a circuit switched network.

36. A computer readable medium including instructions that when executed are operable to:
generate voice scripts using management information received over a remotely initiated inbound call that is initiated using a voice interface device;
use the voice scripts to identify and initiate network management operations for a network processing device;
conduct network management operations on the network processing device according to responses to the voice scripts, the responses being received over the remotely initiated inbound call; and
use the voice scripts to report the results of the network management operations back to the voice interface device.

37. The computer readable medium according to claim 36, wherein the instructions when executed are further operable to use the voice scripts to generate speech verbally presenting the network management options to a user of the voice interface device.

38. The computer readable medium according to claim 37, wherein the instructions when executed are further operable to use a VxML (Voice Extensible Markup Language) for generating the voice scripts.

39. The computer readable medium according to claim 36, wherein the instructions when executed are further operable to receive speech or DTMF (Dual Tone Multi-Frequency) signals as responses to the voice scripts.

40. The computer readable medium according to claim 39, wherein the instructions when executed are further operable to convert the speech or DTMF signals into computer readable text and use the text for conducting the network management operation on the network processing device.

41. The computer readable medium according to claim 40, wherein the instructions when executed are further operable to identify an Internet Protocol (IP) address for the network processing device in the text and use the IP address to identify a network management query protocol supported by the network processing device.

42. The computer readable medium according to claim 41, wherein the instructions when executed are further operable to use the query protocol to obtain status information for the network processing device, to convert the status information into speech, and to send the speech to the voice interface device.

43. The computer readable medium according to claim 36, wherein the instructions when executed are further operable to use the voice based scripts and voice commands from the voice interface device to identify operating status and load conditions for an IP router.

* * * * *